United States Patent [19]

Yotsumoto et al.

[11] Patent Number: 4,621,872
[45] Date of Patent: Nov. 11, 1986

[54] WHEEL TREAD ADJUSTING APPARATUS

[75] Inventors: Toshiyuki Yotsumoto, Kishiwada; Tomeo Umemoto, Osaka, both of Japan

[73] Assignee: Kubota, Ltd., Osaka, Japan

[21] Appl. No.: 726,209

[22] Filed: Apr. 23, 1985

[30] Foreign Application Priority Data

Jul. 26, 1984 [JP] Japan ............................ 59-114741[U]

[51] Int. Cl.[4] ...................................... B60B 36/18
[52] U.S. Cl. ................................ 301/124 H; 301/128
[58] Field of Search .................... 301/124 H, 121, 128

[56] References Cited

U.S. PATENT DOCUMENTS 937,530 10/1909 Hustan ................................. 301/128
2,676,849 4/1954 Houck et al. .................... 301/128 X

FOREIGN PATENT DOCUMENTS 1087462 8/1960 Fed. Rep. of Germany ...... 301/128
53791 4/1934 Norway .............................. 301/128

Primary Examiner—David A. Scherbel
Attorney, Agent, or Firm—Jordan and Hamburg

[57] ABSTRACT

There is disposed a wheel tread adjusting apparatus for a vehicle having a main axle case supported by a vehicle body and slidable cases mounted in right and left ends of the main axle case, respectively, the slidable cases being slidable transversely of the vehicle toward and away from each other. A fixing plate extends between the main axle case and each of the slidable cases, and is secured to one of the two cases. The fixing plate is positionally adjustably lockable to the other of the two cases.

7 Claims, 6 Drawing Figures

WHEEL TREAD ADJUSTING APPARATUS

BACKGROUND OF THE INVENTION

This invention relates to a wheel adjusting apparatus for tractors and other such vehicles.

Certain types of vehicle including tractors have right and left front wheels, for example, whose tread is adjustable to working conditions. A known example of adjusting construction comprises a main front axle case supported by a center shaft on a vehicle body, and slidable cases mounted in right and left ends of the main axle case and carrying front wheels, respectively, the slidable cases being slidable transversely of the vehicle toward and away from each other by a rack and pinion mechanism or the like. According to this construction, a desired tread is established by sliding the slidable cases and thereafter placing wedge elements at the respective ends of the main axle case.

With this prior art construction difficulties have been encountered in pulling out the wedge elements when the wedge elements have become rusted. Furthermore, it is necessary to provide means to lock the slidable cases against rotation relative to the main front axle case, and this has the disadvantage of complicating the construction.

SUMMARY OF THE INVENTION

This invention has for its object to eliminate the disadvantage of the prior art construction noted above.

In order to achieve this object a wheel tread adjusting apparatus according to this invention comprises a fixing plate covering each of the slidable plates from a front side thereof, the fixing plate being attached to one of the main axle case and the slidable case and in slidable contact with the other such that the slidable case is slidable transversely of the vehicle but unrotatable relative to the main axle case, and locking means to permit the fixing plate to be positionally adjustably bolted to said other of the main axle case and the slidable case.

The above construction permits tread adjustments to be carried out with ease compared with the prior art since each slidable case is connected to the main axle case through the fixing plate and the fixing plate is lockable in position by bolts. The fixing plate is arranged to cover the slidable case from a front side thereof thereby to advantageously protect the slidable case. Moreover, the fixing plate is not only operable for tread adjustments but also acts in a locked state to hold the slidable case unrotatable relative to the main axle case. This feature dispenses with separate means for locking the slidable case against rotation relative to the main axle case, which helps toward simplification of the construction.

Other advantages of the invention will be apparent from the following description.

BRIEF DESCRIPTION OF THE DRAWINGS

The drawings illustrate a wheel tread adjusting apparatus embodying this invention, in which.

DESCRIPTION OF THE PREFERRED EMBODIMENT

Figure 1:
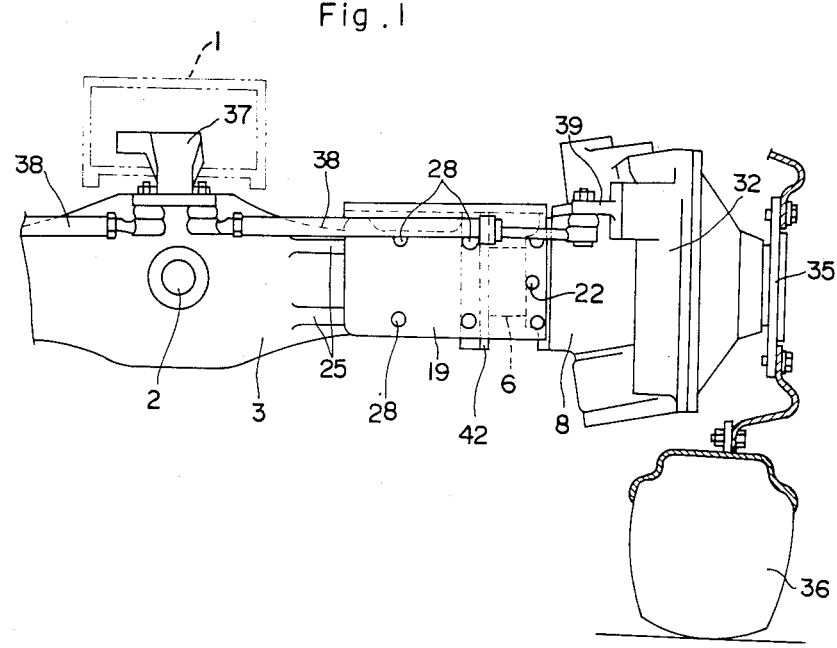
FIG. 1 is a front view of the apparatus.
Figure 4:
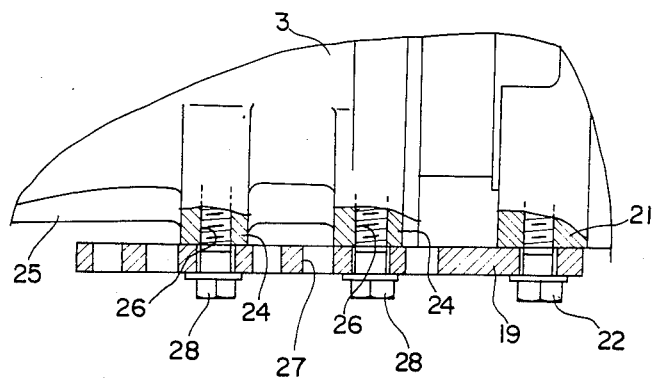
FIG. 4 is a fragmentary plan view of the principal portion.
Figure 2:
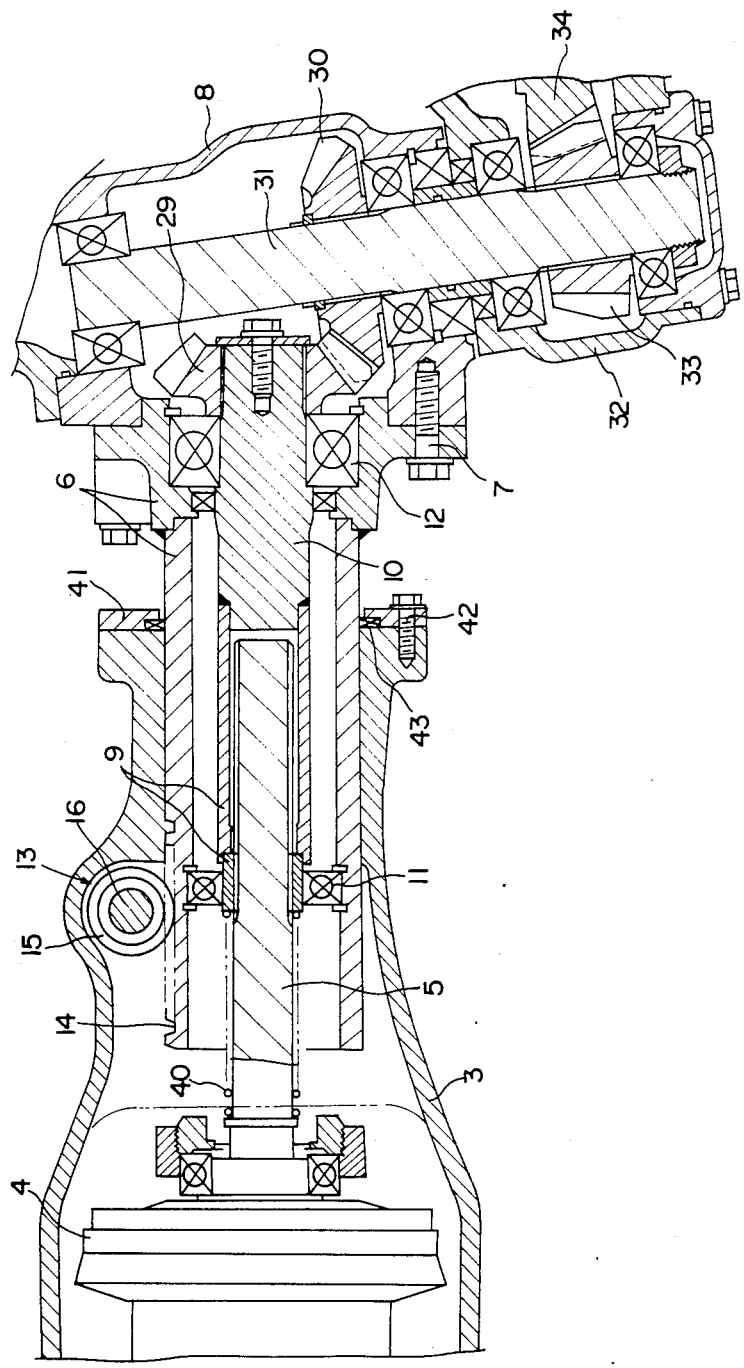
FIG. 2 is a sectional front view of a principal portion of the apparatus.
Figure 3:
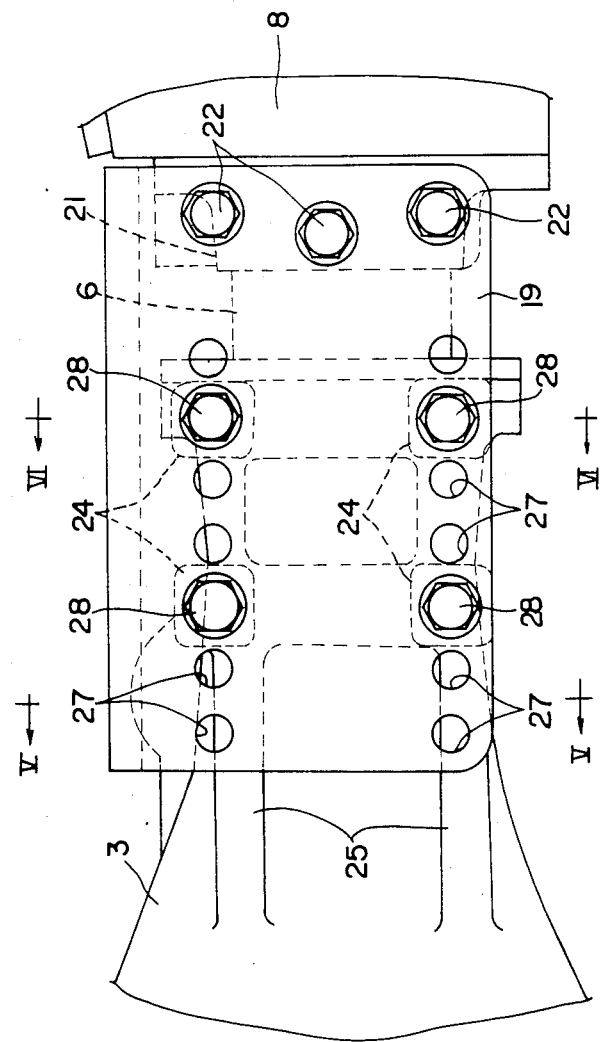
FIG. 3 is an enlarged front view of the principal portion.
Figure 5:
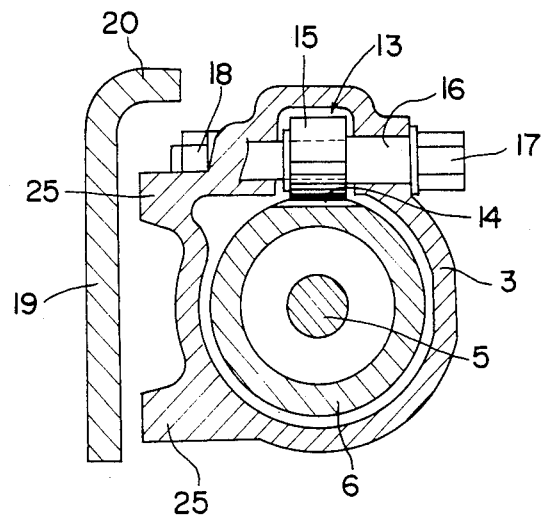
FIG. 5 is a sectional view taken on line V—V in FIG. 3.
Figure 6:
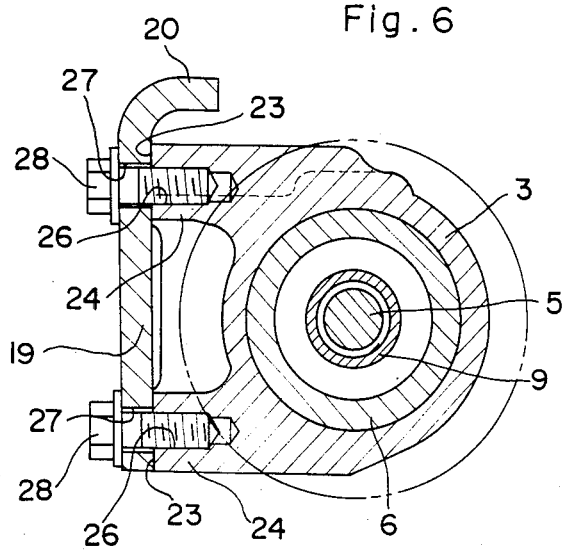
FIG. 6 is a sectional view taken on line VI—VI in FIG. 3.

FIGS. 1 through 6 show a tread adjusting apparatus as incorporated in a four wheel drive tractor. Number 1 denotes a front axle bearing member at a forward portion of the tractor. A main front axle case 3 supported by a center shaft 2 is connected to the bearing member 1. The main front axle case 3 houses a front differential 4 having yoke shaft 5 extending right and left transversely of the tractor, respectively. Slidable cases 6 are mounted in right and left ends of the main front axle case 3, respectively. A gear case 8 is bolted as at 7 to an outer end of each of the slidable cases 6. Each slidable case 6 houses a transmission shaft 10 rotatably supported thereby through bearings 11 and including a tubular portion 9 slidably splined to one of the yoke shafts 5 of the differential 4. Number 13 denotes a rack and pinion mechanism for sliding the slidable case 6, which mechanism 13 comprises a rack 14 defined in an upper face at an inner end of the slidable case 6 and extending in a sliding direction of the slidable case 6, and a pinion 15 in mesh with the rack 14 and keyed to an adjusting shaft 16 supported by the main axle case 3. The adjusting shaft 16 carries a hexagonal adjuster member 17 at one end thereof and a tightening nut 18 at the other end thereof, the adjusting shaft 16 being lockable by tightening the nut 18.

Number 19 denotes a fixing plate having an approximately L-shaped section including a rearwardly extending bent portion 20 at a top end thereof. The fixing plate 19 is disposed so as to cover the slidable case 6 from a front side thereof. The fixing plate 19 is secured by three bolts 22 to a mounting seat 21 provided at the outer end of the slidable case 6. Further, the fixing plate 19 is in contact with front faces 23 of four mounting seats 24 provided on upper and lower edges on a front wall portion of the main front axle case 3, the fixing plate 19 being slidable relative to the main front axle case 3 in transverse directions of the tractor. In other words, the front axle case 3 defines four mounting seats 24 disposed up and down and right and left on a front wall portion adjacent each end thereof, and the fixing plate 19 is in slidable contact with front faces 23 of the mounting seats 24. Therefore, the fixing plate 19 is effective to prevent relative rotation between the main front case 3 and the slidable case 6. It will be seen that two reinforcing ribs 25 extending in the right and left direction are formed on the upper and lower edges on the front wall portion of the main front axle case 3, respectively. Each of the mounting seats 24 defines a bolt receiving bore 26, and the fixing plate 19 defines seven upper mounting bores 27 arranged at equal intervals in the right and left direction and seven lower mounting bores 27 also arranged at equal intervals in the right and left direction, the mounting bores 27 being in opposed relationship with bolt receiving bores 26 of the mounting seats 24. Bolts 28 are inserted through four of the mounting bores 27 to engage with the bolt receiving bores 26, whereby this construction provides a four step tread adjustment. Thus, locking means is provided in the construction of this invention which comprises the plurality of mounting seats 24 arranged at a suitable interval axially of the main axial case 3, a plurality of mounting bores 27 defined in the fixing plate 19 and opposed to the mounting seat 24 of the main axle case 3, and bolts 28 attached to the mounting seats 24 through selected mounting bores of the fixing plate 19.

The gear case 8 houses a bevel gear 29 secured to the transmission shaft 10 and a bevel gear 30 in mesh therewith. The bevel gear 30 is secured to a king pin 31 which is operatively connected, through bevel gears 33 and 34 mounted in a front wheel case 32, to a front wheel 36 supported by a hub 35 attached to the front wheel case 32. The front wheel case 32 is oscillatable relative to the gear case 8 about the king pin 31. Number 37 denotes a steering arm mounted in the front axle bearing member 1, number 38 denotes tie rods, and number 39 denotes a knuckle arm. The tie rods 38 are extendible and retractable according to the pitch of the mounting bores 27. Number 40 denotes a coil spring, and number 41 denotes a lid member. The lid member 41 is attached to the outer end of the main axle case 3 by bolts 42, and retains a sealing element 43 in sliding contact with circumferential walls of the slidable case 6.

How the above construction operates will be described hereinafter. The drawings show a tread between the two front wheels 36 slightly longer than minimum. As seen, the fixing plate 19 is secured to the mounting seats 24 of the main axle case 3 by the bolts 28 inserted into the second and fifth mounting bores 27 from the outer end of the fixing plate 19. Therefore, the tread shown in the drawings is the second smallest. In this state the front axle case 3 and the slidable case 6 are locked together against relative axial movement by means of the fixing plate 19, which is readily achieved by tightening the bolts 28. The fixing plate 19 also acts to prevent relative rotation between the front axle case 3 and the slidable case 6, and therefore the construction requires no special rotation stopping means. Furthermore, the fixing plate 19 covers the circumferential walls of the slidable case 6 from a front side thereof, whereby the circumferential walls of the slidable case 6 are protected from damage.

For changing the tread between the front wheels 36, the bolts 28 are pulled out to disconnect the slidable case 6 from the main front axle case 3, and then the adjusting shaft 16 is operated to turn the pinion 15 which, through the engagement with the rack 14, slides the slidable case 6 transversely of the tractor. At this time too the slidable case 6 is unrotatable relative to the main front axle case 3 since the fixing plate 19 is slidable on the mounting seats 24. When the slidable case 6 slides to a certain extent to bring the mounting bores 27 into coincidence with the bolt receiving bores 26 of the mounting seats 24, the bolts 28 are simply inserted into the bores and tightened to fix the fixing plate 19 to the mounting seats 24 to complete the adjustments. Needless to say, the tie rod 38 is adjusted at the same time.

While the fixing plate 19 is secured to the slidable case 6, the fixing plate 19 may be secured to the main front axle case 3 instead. The mounting bores 27 may be provided separately from one another as described or may have a continuous elongate shape.

What is claimed is:

1. A wheel tread adjusting apparatus for a vehicle having a main axle case supported by a vehicle body and slidable cases mounted in right and left ends of the main axle case and carrying ground engaging wheels, respectively, the slidable cases being slidable transversely of the vehicle toward and away from each other, said apparatus comprising for each of said slidable cases a fixing plate extending transversely of said vehicle and being unrotatable relative to the main axle case, and locking means to permit the fixing plate to fix the main axle case and the slidable case in any of a plurality of positions relative to each other.

2. A wheel tread adjusting apparatus according to claim 1, in which the fixing plate faces and covers the front of said slidable case.

3. A wheel tread adjusting apparatus as claimed in claim 2 wherein the fixing plate has an approximately L-shaped section including a rearwardly extending bent portion at a top thereof.

4. A wheel tread adjusting apparatus as claimed in claim 3 wherein the fixing plate is bolted to a mounting seat at an outer end of the slidable case.

5. A wheel tread adjusting apparatus as claimed in claim 4 wherein the locking means includes a plurality of mounting seats arranged at a suitable interval axially of the main axle case, a row of mounting bores defined in the fixing plate and opposed to the mounting seats of the main axle case, and bolts attached to the mounting seats of the main axle case through selected mounting bores of the fixing plate.

6. A wheel tread adjusting apparatus as claimed in claim 4 or 5 wherein the mounting seats are connected by reinforcing ribs extending axially of the main axle case.

7. A wheel tread adjusting apparatus as claimed in claim 4 or 5 wherein the main axle case is oscillatably mounted on a horizontal center shaft attached to the vehicle body.

* * * * *